(12) United States Patent
Essen et al.

(10) Patent No.: US 11,225,032 B2
(45) Date of Patent: Jan. 18, 2022

(54) DEVICE FOR PRODUCING TUBULAR BAGS SEALED ON MULTIPLE SIDES

(71) Applicant: HASTAMAT VERPACKUNGSTECHNIK GMBH, Lahnau (DE)

(72) Inventors: Ivan Essen, Butzbach (DE); Olaf Piepenbrock, Osnabrueck (DE)

(73) Assignee: HASTAMAT VERPACKUNGSTECHNIK GMBH & CO. KG, Lahnau (DE)

(*) Notice: Subject to any disclaimer, the term of this patent is extended or adjusted under 35 U.S.C. 154(b) by 64 days.

(21) Appl. No.: 16/693,620

(22) Filed: Nov. 25, 2019

(65) Prior Publication Data
US 2020/0164600 A1 May 28, 2020

(30) Foreign Application Priority Data

Nov. 26, 2018 (DE) ...................... 10 2018 129 676.2

(51) Int. Cl.
*B29C 65/00* (2006.01)
*B29C 65/18* (2006.01)
*B29L 31/00* (2006.01)

(52) U.S. Cl.
CPC ........ *B29C 66/43121* (2013.01); *B29C 65/18* (2013.01); *B29C 66/8511* (2013.01); *B29L 2031/7128* (2013.01)

(58) Field of Classification Search
CPC ........... B29C 66/43121; B29C 66/8511; B29C 66/133; B29C 65/18; B29L 2031/7128; B65B 2220/12
See application file for complete search history.

(56) References Cited

U.S. PATENT DOCUMENTS 5,746,043 A * 5/1998 Terminella ............ B29C 65/305
53/451

FOREIGN PATENT DOCUMENTS

| DE | 2337216 A1 | 2/1975 | |
| DE | 10027581 A1 * | 12/2001 | ........... B65B 9/2042 |
| DE | 10027581 A1 | 12/2001 | |
| EP | 0627355 B1 | 8/1997 | |
| EP | 1609720 A1 * | 12/2005 | ........... B65B 9/2042 |
| EP | 1609720 A1 | 12/2005 | |
| JP | H10245002 A | 9/1998 | |
| JP | 2004352306 A | 12/2004 | |
| JP | 2005119185 A | 5/2005 | |

OTHER PUBLICATIONS

Machine Translation of DE-10027581-A1 (Year: 2001).*

* cited by examiner

*Primary Examiner* — Daniel McNally
(74) *Attorney, Agent, or Firm* — Quarles & Brady LLP

(57) ABSTRACT

A device for producing tubular bags sealed on multiple sides, the device including a forming shoulder for deforming a plane film web into an envelope web and a forming tube surrounded by the envelope web, the forming tube having, adjacent to a forming shoulder outlet, fins for forming film overlap areas, and a film guide having first and second film guide elements, each of which is associated with one of the fins.

7 Claims, 5 Drawing Sheets

DEVICE FOR PRODUCING TUBULAR BAGS SEALED ON MULTIPLE SIDES

This application claims priority to German Patent Application No. 10 2018 129 676.2 filed Nov. 26, 2018. The contents of this application are hereby to incorporated by reference as if set forth in its entirety herein.

The present disclosure relates to a device for producing tubular bags sealed on multiple sides, the device comprising a forming shoulder for deforming a plane film web into an envelope web, a forming tube surrounded by the envelope web, and a longitudinal seal former which surrounds the forming tube and which has a film guide for forming film overlap areas extending in the transport direction of the film web and which comprises a heat sealer for forming longitudinal sealed seams in the film overlap areas, the forming tube having, adjacent to a forming shoulder outlet, a number of fins for forming the film overlap areas, the number of fins corresponding to the number of longitudinal sealed seams.

A device of the aforementioned kind that allows the production of tubular bags is known from EP 0 627 355 B1. The production of the longitudinal sealed seams by means of the known device requires that the film web, which is still plane until it reaches the forming shoulder, has already been turned into a film tube after having been deformed into an envelope tube surrounding the forming tube by production of a first longitudinal sealed seam so that the fins formed on the forming tube can subsequently be used in combination with a pair of sealing tools assigned with each fin and having two counteracting sealing jaws to produce additional longitudinal sealed seams so as to realize the multiple sealed sides.

Based on the aforementioned state of the art, the object of the disclosure is to propose a device that allows a production of tubular bags sealed on multiple sides in which all longitudinal sealed seams formed on the tubular bag can be produced at the same time.

To attain said object, the device according to the disclosure has the features of claim 1.

In the device according to the disclosure, the film guide has first and second film guide elements assigned to each of the fins in such a manner that one fin is disposed between one first and one second film guide element in each case so as to form a double guide gap, the first and second film guide elements being adjustable independently of each other in terms of their position relative to the fin.

Contrary to the known device, the device according to the disclosure allows overlap areas to be produced without requiring a film tube with a closed film cross-section to be produced beforehand because the double guide gap is formed by the first and second film guide elements positioned relative to the fins. Furthermore, there is also no need for sealing tools of the heat sealer to be provided in a defined position relative to the fins in order to form the overlap areas. Instead, the design of the device according to the disclosure allows the overlap areas to be produced on the envelope web still having an open film web cross-section because the double guide gap, which is formed by the position of the fins relative to the first and second film guide elements, allows the overlap areas to be formed on the film web independently of the production a first longitudinal sealed seam which enables the formation of a film tube by connecting the film web edges in the first place.

Instead, when using the device according to the disclosure, the longitudinal sealed seam which connects the film web edges to each other and which turns the envelope web into the film tube can be formed at the same time as the other longitudinal sealed seams so as to form the multiple sealed sides.

Moreover, since the first and second film guide elements are adjustable independently of each other in terms of their position relative to the fins, the device according to the disclosure allows easy adjustment of the film guide to the film web used to produce the tubular bags, wherein the flexibility and the film thickness can especially be taken into account by suitable adjustment of the gap widths of the double guide gap.

In particular, the adjustability of the film guide allows adjustments to the film guide to be made in situ, i.e. without first having to uninstall the forming tube and the film guide from a system for producing tubular bags. In particular, no post-processing of the film guide, such as material removal on components of the film guide, i.e. the first and second film guide elements, for example, is required in order to influence the clearances needed for the formation of the overlap areas.

Particularly advantageously, the first film guide elements are disposed on a forming tube support, the first film guide elements preferably being disposed on a bracket disposed displaceable in at least one axial direction on the forming tube support, allowing the forming tube support, which is used for installing the forming tube, to also be used for mounting the first film guide elements.

If the first film guide elements are disposed displaceable in at least one axial direction on the bracket, a first adjusting mechanism can be formed on the bracket, allowing the forming tube support, which is employed by default in a particularly simple embodiment of the device, to also be used unchanged in combination with the device according to the disclosure.

Particularly advantageously, the second film guide elements are disposed on the longitudinal seal former, which is connected to the forming tube support, the second film guide elements each being disposed on a sealing ridge of the longitudinal seal former, in which case a component needed anyway to form the longitudinal seal former and allowing production of the longitudinal seams in cooperation with a heat sealer can also be used to install the second film guide elements.

If the sealing ridges of the longitudinal seal former are disposed displaceable on the longitudinal seal former in order for the second film guide elements to be displaceable, a second adjusting axis for particularly precise positioning of the second film guide elements is realized in a simple manner.

Preferably, two sealing ridges are disposed adjustable in terms of their relative position on each sealing ridge support in order for the sealing ridges to be displaceable, the sealing ridge support being disposed displaceable on the longitudinal seal former.

If the sealing ridges are disposed displaceable on a first auf axis in an adjusting plane perpendicular to the transport direction of the film web and the sealing ridge support is disposed displaceable on a second axis perpendicular tot eh first axis, particularly precise positioning of the second film guide elements is possible, as well.

Hereinafter, a preferred embodiment of the disclosure will be explained in more detail by way of the drawing.

Figure 1:
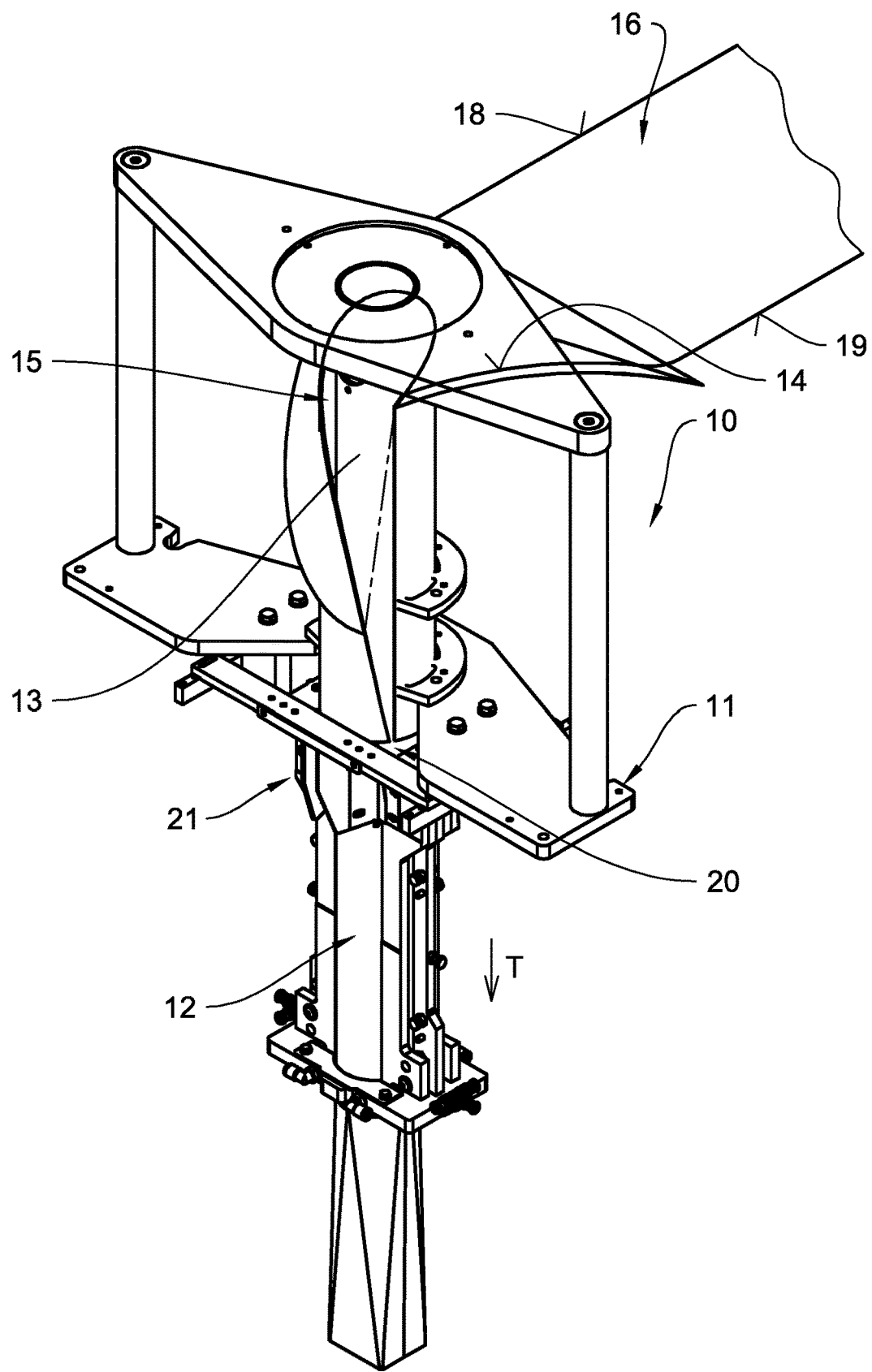
FIG. 1 is an isometric illustration showing a device for producing tubular bags sealed on multiple sides.
Figure 2:
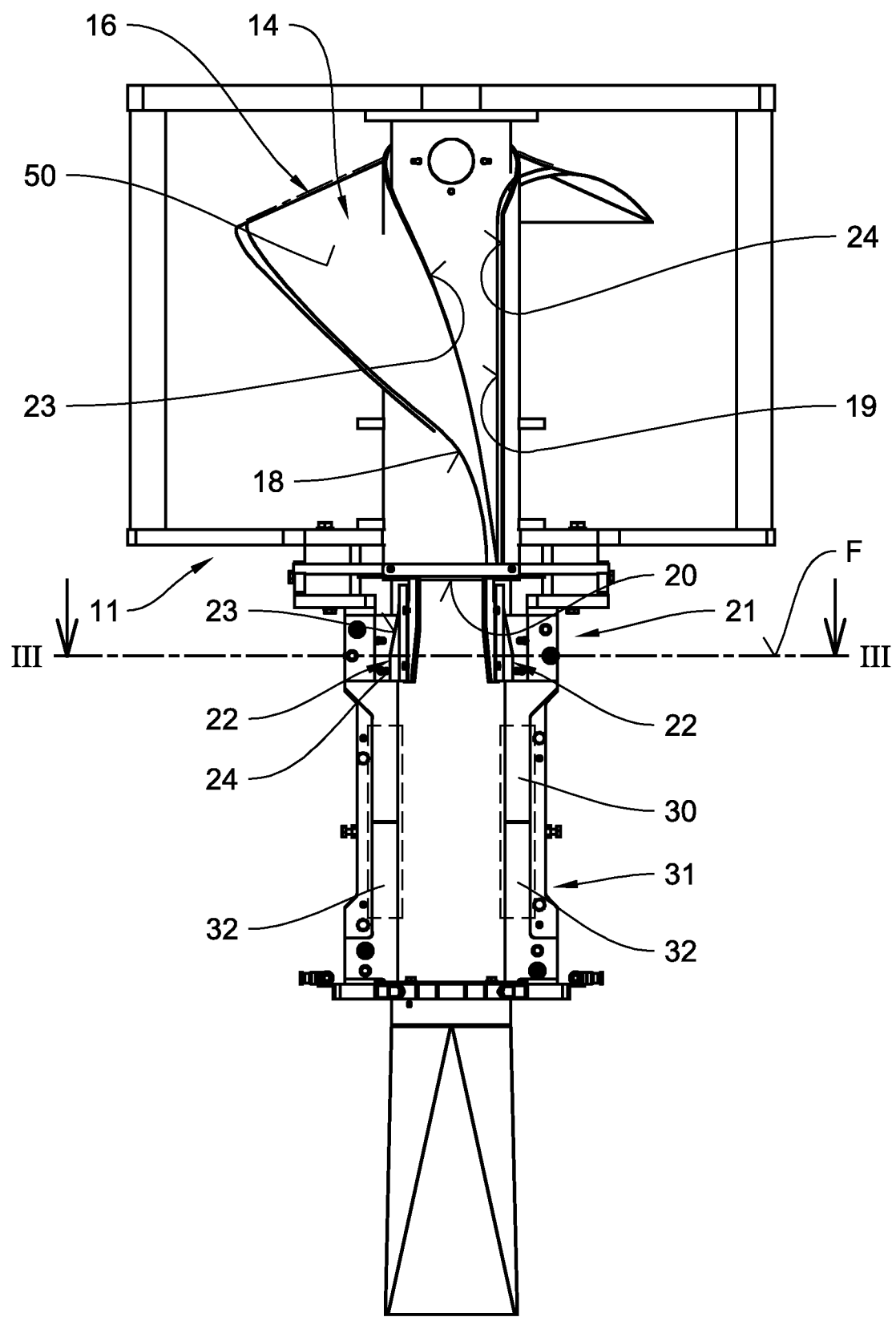
FIG. 2 is a front view of the device shown in FIG. 1.

The device 10 illustrated FIGS. 1 and 2 comprises a forming tube 12 which is disposed on a forming tube support 11 and an upper forming shoulder portion 13 of which is surrounded by a forming shoulder 14 in such a manner that an annular gap 15 is formed between forming shoulder portion 13 and forming shoulder 14, a film web 16, which is merely hinted at in FIG. 1 and which is guided toward forming shoulder 14, being introduced into said annular gap 15 while being in contact with a forming shoulder surface 50 in such a manner that film edges 18, 19 are moved toward each other at convergingly disposed guide edges 23, 24 of forming shoulder 14 and arrive in an adjacent relative position at a film guide 21, whose function will be explained in more detail below, below a forming shoulder outlet 20 formed at the end of guide edges 18, 19.

Figure 3:
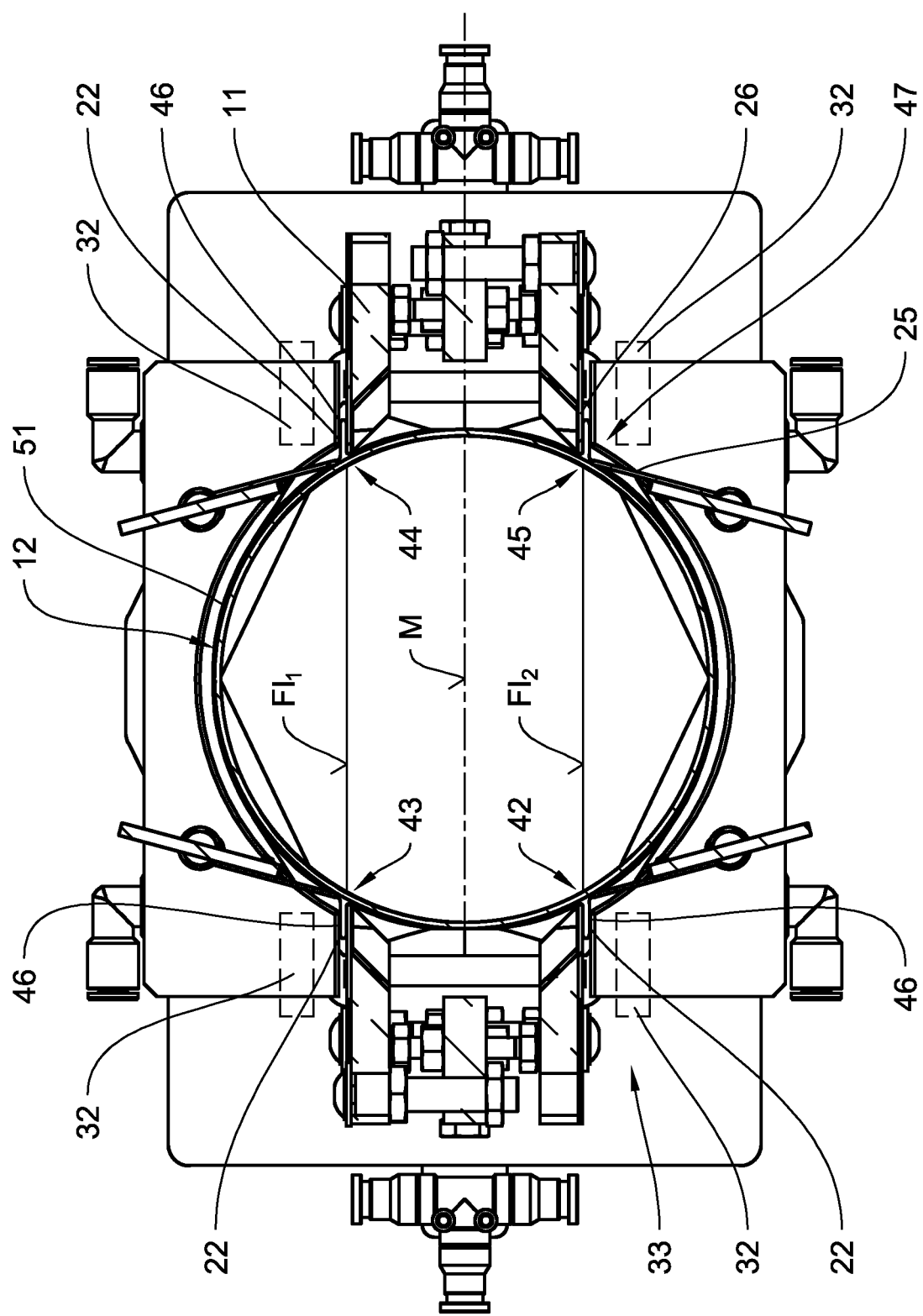
FIG. 3 is a section view of the device shown in FIG. 2 along line in FIG. 2.

As shown in FIG. 2, film guide 21 is located in a shared film guiding plane F with fins 22, which, in the case at hand, are formed on forming tube 12 in such a manner that, as shown in FIG. 3, in particular, each two fins 22 disposed opposite each other at the circumference of forming tube 12 are located in a shared fin plane $FI_1$ and $FI_2$, the two fin planes $FI_1$ and $FI_2$ being disposed parallel to each other and located on opposite sides of a center axis M of forming tube 12 at an identical distance in the case at hand.

As shown in FIG. 2, fins 22 are each provided with a rising guide edge 23 in transport direction T (FIG. 1) of film web 16, guide edge 23 ending in a guide edge 24 formed parallel to the surface of forming tube 12 in the further course of fins 22 in transport direction T.

Figure 5:
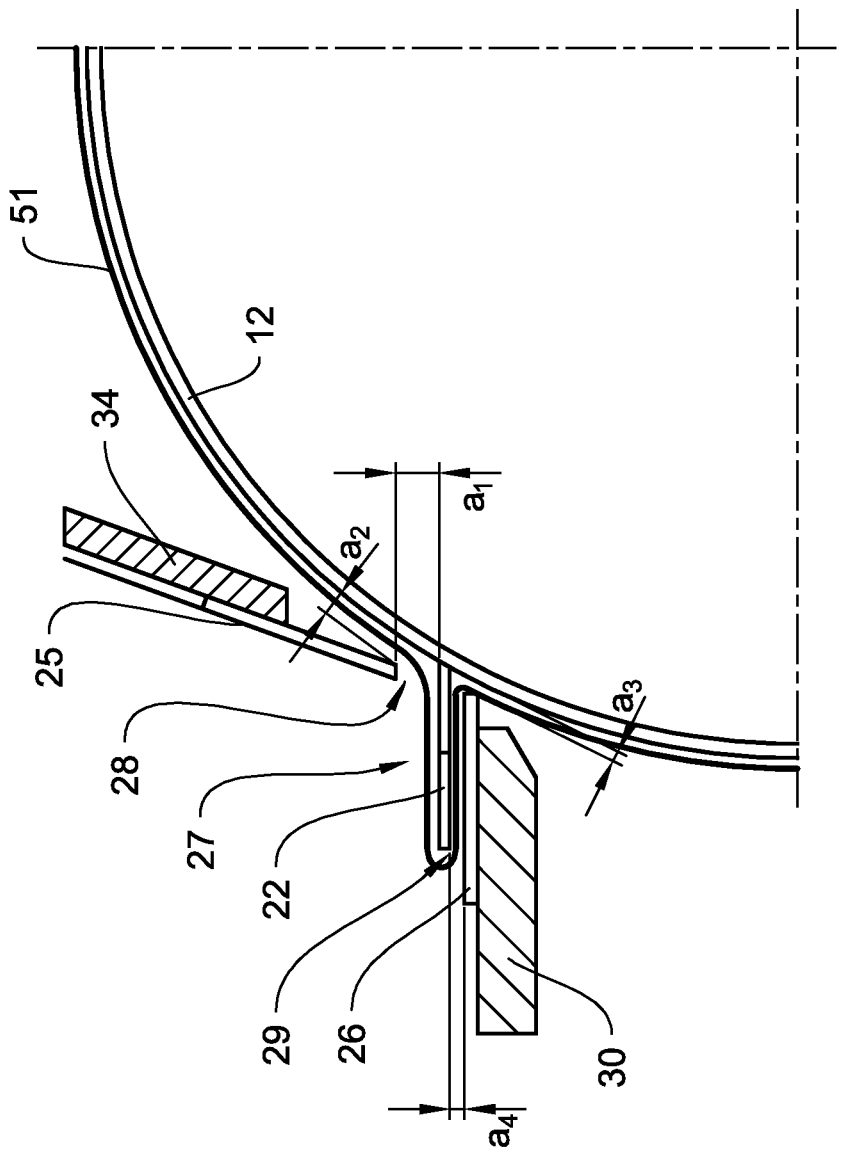
FIG. 5 is an enlarged partial view of a guide assembly of a film guide.

As shown in FIG. 5, a first film guide element 25 and a second film guide element 26 extend on both sides of each of fins 22 and along them in such a manner that the relative position of first and second film guide elements 25, 26 with fin 22 disposed between them leads to a double guide gap 27 being formed, with a first guide gap 28 formed between first film guide element 25 and fin 22 and a second guide gap 29 formed between fin 22 and second film guide element 26.

In the case of the embodiment shown, first film guide elements 25 are located on forming tube support 11 (FIG. 2) and second film guide elements 26 are each disposed on a sealing ridge 30 of a longitudinal seal former 31, which, each in combination with a sealing jaw 32 (FIG. 3) of a heat sealer 33, serve to form longitudinal sealed seams.

For the sake of a clearest illustration possible, sealing jaws 32 of heat sealer 33 are illustrated merely schematically in FIGS. 2 and 3, each sealing jaw 32 being disposed opposite a sealing ridge 30 of longitudinal seal former 31.

Figure 4:
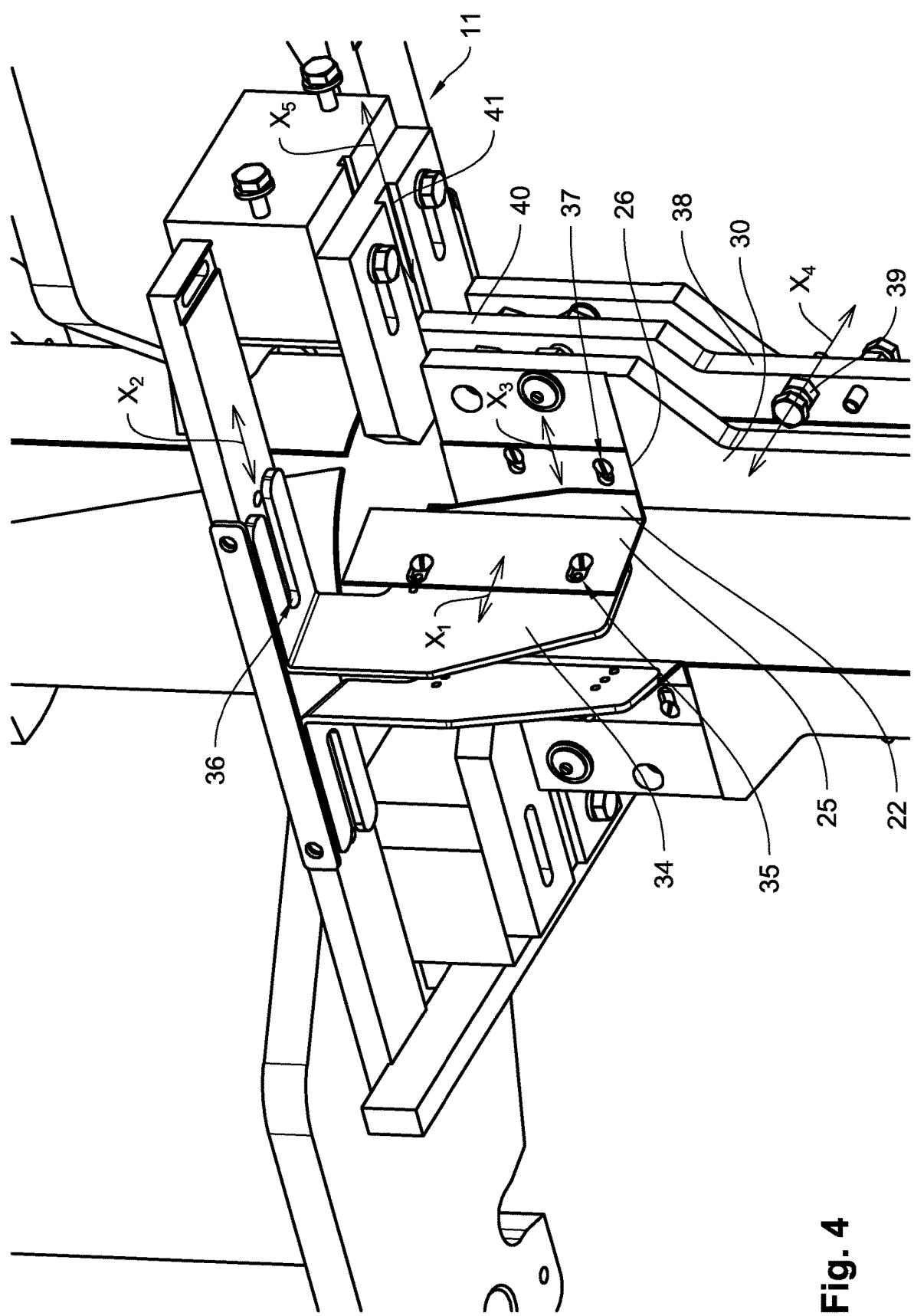
FIG. 4 is an enlarged partial view of the device illustrated in FIG. 1, showing an area of transition formed between a forming shoulder and a forming tube.

As becomes clear from a combined view of FIGS. 3 and 4, in particular, first film guide elements 25 and second film guide elements 26 can be changed independently of each other in terms of their position relative to fin 22, which is disposed between a first film guide element 25 and a second film guide element 26 in each case, and can be fixed in the changed relative position. To this end, first film guide elements 25 are each displaceable in a first axial direction $X_1$ on a bracket 34 via a positioning mechanism 35, which is realized as an oblong hole screw connection in the case at hand. Moreover, brackets 34 are also displaceable in a second axial direction $X_2$ in terms of their position relative to forming tube support 11, which is not illustrated in its entirety in FIG. 4 for the sake of clarity, a positioning mechanism 36, which is also realized as an oblong hole screw connection, being used for this purpose.

As can be gathered from FIG. 4, in particular, the relative position of first film guide element 25 can be changed by actuating positioning mechanism 35 in order to set distance $a_1$ relative to fin 22 (FIG. 5), actuation of positioning mechanism 36 allowing distance $a_2$ between first film guide element 25 and forming tube 12 to be changed.

Second film guide elements 26, which are each disposed on a sealing ridge 30 of longitudinal seal former 31, can be changed in terms of their position relative to sealing ridge 30 along an axial direction $X_3$ by means of a positioning mechanism 37, which is also realized as an oblong hole screw connection in the case at hand, allowing distance $a_3$ of second film guide element 26 relative to forming tube 12 to be influenced. To change distance $a_4$ of film guide element 26 relative to fin 22, sealing ridges 30 can be changed in terms of their distance relative to a sealing ridge support 38 along an axial direction $X_4$ (FIG. 4). To this end, a positioning mechanism 39 is provided between a sealing ridge 30 and a sealing ridge support 38 in each case, said positioning mechanism 39, in the case at hand, being formed by a bolt screw connection whose length between sealing ridge 30 and sealing ridge support 38 can be changed.

Moreover, by coupling two adjacent sealing ridges 30 by means of a shared sealing ridge support 38, second film guide elements 26 can be displaced together along axial direction $X_5$ by correspondingly changing the relative position of axial sealing ridge support ends 40 in a longitudinal guide 41 formed on forming tube support 11.

As becomes clear from FIG. 3, which shows a cross-section through the film guide, film guide 21, in cooperation with fins 22 formed on the circumference of forming tube 12, makes possible that, in an envelope web 51 which is exiting from forming shoulder outlet 20 and which, upon exit from forming shoulder outlet 20 and entry into film guide 21, has not yet been formed into a film tube having a closed cross-section and does not yet have a longitudinal seam as a prerequisite for the formation of the film tube, continuous film overlap areas 46 are formed in the area of three guide arrangements 42, 43, 44 of the total of four guide arrangements 42 to 45, which each have a first film guide element 25 and a second film guide element 26, when envelope web 51 enters film guide 21, a film overlap area 47 in which film edges 18, 19 are located parallel opposite each other and are not yet connected to each other being formed below guide edges 18, 19 of guide arrangement 45 disposed on forming shoulder outlet 20.

As shown in FIG. 2, heat sealer 32 comprising sealing jaws 33, which are each located opposite a sealing ridge 30, is located below film guide 21 in the transport direction of the film web, which means that a total of four longitudinal sealed seams are not formed in film overlap areas 46, 47 until envelope web 51 has exited film guide 21, the longitudinal sealed seam for connecting film edges 18, 19 located opposite each other in overlap area 47, which allows a film tube to be formed in the first place, also being formed at the same time as the other three longitudinal sealed seams are formed in film overlap areas 46 so as to produce the multiple sealed sides.

The invention claimed is:

1. A device for producing tubular bags sealed on multiple sides, the device comprising a forming shoulder for deforming a plane film web into an envelope web, a forming tube which is surrounded by the envelope web, and a longitudinal seal former which surrounds the forming tube and which has a film guide for forming film overlap areas extending in the transport direction of the film web and which comprises a heat sealer for forming longitudinal sealed seams in the film overlap areas, the forming tube having, adjacent to a forming shoulder outlet, a number of fins for forming the film overlap areas, the number of fins corresponding to the number of longitudinal sealed seams, and the film guide having first and second film guide elements, each of which is associated with one of the fins, each fin being disposed between a first and a second film guide element in such a manner that a double guide gap is formed, the first and second film guide elements being adjustable independently of each other in terms of their position relative to the fin, the first film guide elements are each displaceable in at least a first axial direction X1 on a first axis, and the second film guide elements are each displaceable in at least a second axial direction X5 on a second axis, the first axis being different from the second axis.

2. The device according to claim 1, wherein the first film guide elements are disposed on a forming tube support, the first film guide elements being disposed on a bracket which is disposed displaceable in at least one axial direction on the forming tube support.

3. The device according to claim 2, wherein the first film guide elements are disposed displaceable in at least one axial direction on the bracket.

4. The device according to claim 2, wherein the second film guide elements are disposed on the longitudinal seal former, which is connected to the forming tube support, the second film guide elements each being disposed on a sealing ridge of the longitudinal seal former.

5. The device according to claim 4, wherein in order for the second film guide elements to be displaceable the sealing ridges of the longitudinal seal former are disposed displaceable on the longitudinal seal former.

6. The device according to claim 5, wherein in order for the sealing ridges to be displaceable, two sealing ridges are disposed displaceable in terms of their relative position on each sealing ridge support, the sealing ridge support being disposed displaceable on the longitudinal seal former.

7. The device according to claim 6, wherein the sealing ridges are disposed displaceable on a first axis in a positioning plane perpendicular to the transport direction of the film web and the sealing ridge support is disposed displaceable on a second axis perpendicular to the first axis.

* * * * *

UNITED STATES PATENT AND TRADEMARK OFFICE
CERTIFICATE OF CORRECTION

PATENT NO. : 11,225,032 B2
APPLICATION NO. : 16/693620
DATED : January 18, 2022
INVENTOR(S) : Ivan Essen et al.

Page 1 of 1

It is certified that error appears in the above-identified patent and that said Letters Patent is hereby corrected as shown below:

In the Specification

Column 1, Line 6, "hereby to incorporated" should be --hereby incorporated--.

Column 2, Line 67, "line in" should be --line III-III in--.

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*